(12) United States Patent
Arquie

(10) Patent No.: US 6,880,127 B1
(45) Date of Patent: Apr. 12, 2005

(54) METHOD FOR ROUTING CONNECTIONS IN THE DISPLAY OF A NETWORK TOPOLOGY

(75) Inventor: Louis Arquie, Cupertino, CA (US)

(73) Assignee: SANavigator, Inc., Broomfield, CO (US)

(*) Notice: Subject to any disclaimer, the term of this patent is extended or adjusted under 35 U.S.C. 154(b) by 814 days.

(21) Appl. No.: 09/918,694

(22) Filed: Jul. 30, 2001

Related U.S. Application Data
(60) Provisional application No. 60/228,516, filed on Aug. 28, 2000.

(51) Int. Cl.[7] .................. G06F 17/50; G06F 15/16; G06T 11/20
(52) U.S. Cl. .................. 715/735; 715/964; 715/734; 345/443; 709/223
(58) Field of Search .................. 715/735, 964, 715/734, 736, 738, 967, 969, 970, 771, 502, 526; 709/223, 224; 703/13, 14, 18, 21; 345/443, 441, 440

(56) References Cited

U.S. PATENT DOCUMENTS

| | | | | |
|---|---|---|---|---|
| 4,875,187 A | * | 10/1989 | Smith | 345/441 |
| 4,970,664 A | * | 11/1990 | Kaiser et al. | 715/964 X |
| 5,276,789 A | | 1/1994 | Besaw et al. | |
| 5,278,951 A | | 1/1994 | Camacho et al. | |
| 5,596,704 A | * | 1/1997 | Geddes et al. | 715/970 X |
| 5,910,803 A | | 6/1999 | Grau et al. | |
| 6,014,715 A | | 1/2000 | Stoevhase | |
| 6,067,093 A | | 5/2000 | Grau et al. | |
| 6,078,324 A | | 6/2000 | Phathayakorn et al. | |
| 6,369,819 B1 | | 4/2002 | Pitkow et al. | |
| 6,784,902 B1 | * | 8/2004 | Melder et al. | 715/771 |
| 6,801,200 B1 | * | 10/2004 | Prakriya et al. | 345/440 |

OTHER PUBLICATIONS

"PDQROUTE—a Rapid Line Router for Automatically Generating Interconnections on a Logic Diagram", IBM Technical Discolsure Bulletin, vol. 27, No 7A, Dec. 1, 1994, pp. 3759–3768.*

* cited by examiner

*Primary Examiner*—Raymond J. Bayerl
(74) *Attorney, Agent, or Firm*—Hensley Kim & Edgington, LLC

(57) ABSTRACT

The present invention provides a systematic automated procedure for routing connections in display applications such as a network topology interface. In one embodiment, the invention first creates an "ideal routing" between two given nodes. The ideal routing includes three segments that join the nodes. If any obstructions exist on the original segments of the ideal routing then the procedure systematically reroutes the appropriate segments to achieve an efficient, visually cohesive and organized routing. The routing procedure operates at different layers, groups and subgroups of nodes. By using the procedure with a layered design it is possible to achieve fast, uniform and effective routing in very complex systems with many nodes and inter-node connections.

11 Claims, 5 Drawing Sheets

METHOD FOR ROUTING CONNECTIONS IN THE DISPLAY OF A NETWORK TOPOLOGY

CLAIM OF PRIORITY

This application claims priority from Provisional Patent Application Ser. No. 60/228,516 (K35A0660) filed Aug. 28, 2000 which is hereby incorporated by reference as if set forth in full in this document.

CROSS-REFERENCE TO RELATED APPLICATIONS

This application is related to the following co-pending patent applications which are each hereby incorporated by reference as if set forth in full in this document for all purposes:

U.S. Patent Application entitled "METHOD FOR DISPLAYING NODES OF A NETWORK USING A MULTI-LAYER REPRESENTATION WHEREIN NODES CAN BE SELECTIVELY COLLAPSED OR EXPANDED," filed on Mar. 31, 2000; Ser. No. 09/539,350. (K35A0588).

U.S. Patent Application entitled "METHOD FOR DISPLAYING SUPERSETS OF NODE GROUPS IN A NETWORK," filed on Jun. 22, 2001; Ser. No. 09/888,095.

BACKGROUND OF THE INVENTION

This invention relates in general to computer user interfaces and more specifically to a method for automatically routing and displaying connections between nodes in a network topology displayed on a computer user interface.

Computer graphics has become an important application for computer systems. The ability to clearly and effectively display information in a graphical form has spawned many useful computer programs such as for computer-assisted drawing (CAD), electronic and microelectronic circuit layout, network topology display and network management, etc.

Although there are many applications that effectively use computer graphics to provide an efficient user interface, problems arise due to the ever-increasing complexity and density of the information to be displayed. For example, today's networks have many components, or nodes, including servers, disk arrays, routers, hubs, switches, clients, etc. Each node may have several, or many, connections to other nodes. Generally, interfaces for network topology management analysis and configuration allow a human user to specify types of devices (i.e., nodes) to be used in the system; and to designate interconnections between the devices. A human user is usually relieved from routing connections between and among nodes in the interface, as the routing process is automated.

An interface, or automated system, computes a routing for connections so that connections are routed and displayed without intersecting unwanted nodes. However, while it is desirable for a system to automatically perform routing and display of connections in a network topology application it is often difficult to achieve efficient, organized and aesthetically pleasing routing, especially in "real time." This is especially true where the number of nodes and connections is relatively large. Also, modern systems typically allow a user to "drag and drop" nodes on the screen, add and delete nodes, connections, etc. This, naturally, changes the relative positions of nodes and often requires that routing of many interconnections must be quickly recomputed.

Thus, it is desirable to provide an invention that improves upon one or more of the shortcomings of the prior art.

SUMMARY OF THE INVENTION

The present invention provides a systematic automated procedure for routing connections in display applications such as a network topology interface. In one embodiment, the invention first creates an "ideal routing" between two given nodes. The ideal routing includes three segments that join the nodes. If any obstructions exist on the original segments of the ideal routing then the procedure systematically reroutes the appropriate segments to achieve an efficient, visually cohesive and organized routing.

The routing procedure operates at different layers, groups and subgroups of nodes. By using the procedure with a layered design it is possible to achieve fast uniform and effective routing in very complex systems with many nodes and internode connections.

In one embodiment the invention provides a method for displaying connections in a system for displaying a network topology. The method includes displaying horizontal and vertical lines on the display to connect the first and second nodes, wherein the path from the first node to the second node alternates between horizontal and vertical lines, wherein a horizontal and vertical line along the path are connected at a crosspoint; selecting the crosspoint such that no obstructing node is encountered along the path; and ensuring that the crosspoint occurs beyond a predetermined distance along a given line unless this causes the path to cross an obstructing node, in which case the crosspoint is made to be before the obstructing node.

DESCRIPTION OF THE SPECIFIC EMBODIMENTS

A preferred embodiment of the invention is incorporated into a software product called "SANavigator" produced and distributed by SANavigator, Inc.

Figure 1A:
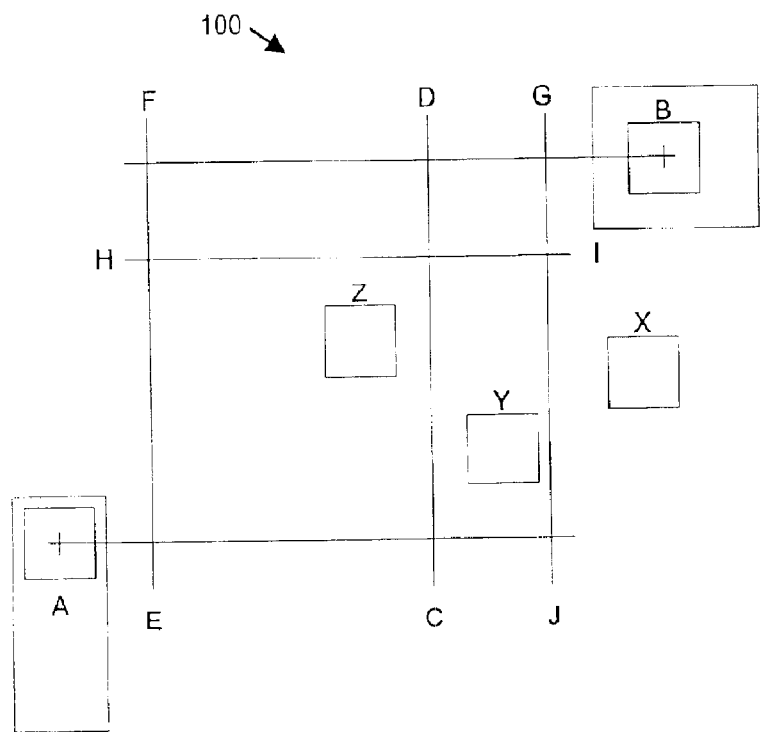
FIG. 1A illustrates a portion of a screen display of the present invention.

FIG. 1A illustrates a portion of a screen display of the SANavigator interface of the present invention.

In FIG. 1A, screen display portion 100 includes interconnected nodes A and B. Nodes include any type of network device such as a hub, server, switch, servers, client processors, computers, routers, etc. Typically, a node can be any type of hardware device or functionality that is of interest in analyzing, creating or managing a communications network. Further, as described in the above-referenced related applications, a preferred embodiment of the present invention allows nodes to be grouped into "group nodes" which can then be represented as a single icon, or node, in a multilayer representation.

A group node of a second layer in a multilayer representation can be selectively expanded to display nodes contained in a first layer. A lower layer with respect to a given layer is also referred to as a "sub-layer." A group of nodes in the first layer (also called a "subgroup") can be selectively contracted to display the group of nodes as a single "group node" in the second layer. For example, in FIG. 1A, assuming node A is a subgroup, node A can be expanded to show multiple nodes. Since nodes in a group can be represented as a single node at a higher layer of display, the single node is also referred to as a "parent node" of nodes in the group. A node has a single parent. That parentcan, successively, have a parent. All successive parents of a node are referred to as "ancestors" of the node. When two nodes have a same ancestor node somewhere in the successive chain, that same ancestor node is referred to as a "common ancestor node" of the two nodes.

FIG. 1A shows line segments and line segment endpoints. Line segment endpoints include endpoints A through J. Line segments are referenced by their endpoints as, e.g., line segment E-F, line segment A-E, line segment A-J, etc. Line directions are referenced by following the line segment in the order designated by the recitation of the line endpoints. For example, the direction A-E is from left-to-right along the line segment A-E, while the direction E-A is from right-to-left along the line segment A-E. Similarly, F-E designates a top-to-bottom direction while E-F designates a bottom-to-top direction.

In FIG. 1A, one possible routing between nodes A and B includes the three line n-segments of A-C, C-D and D-B (also written, collectively, as A-C-D-B). The present invention defines "grid lines" among nodes in a group. Grid lines are predefined. Nodes are placed into cells between the grid lines so that grid lines will not intersect the nodes, such as nodes A, B, X, Y and Z. However, since connection routing must start and end at a node, the first and last parts of the routing must use line segments that intersect with nodes. Hence, these first and last line segments have the potential to also create undesirable intersections with other nodes. Line segments that intersect with nodes are referred to here as "node join segments." Since node join segments are not along grid lines, a node join segment may, if extended, cause unwanted intersections with other nodes assuming other nodes are present in the group. The routing process of the present invention is designed to resolve instances where the node join segments (i.e., the first and third line segments of an ideal routing) cause an unwanted intersection with a node.

Figure 1B:
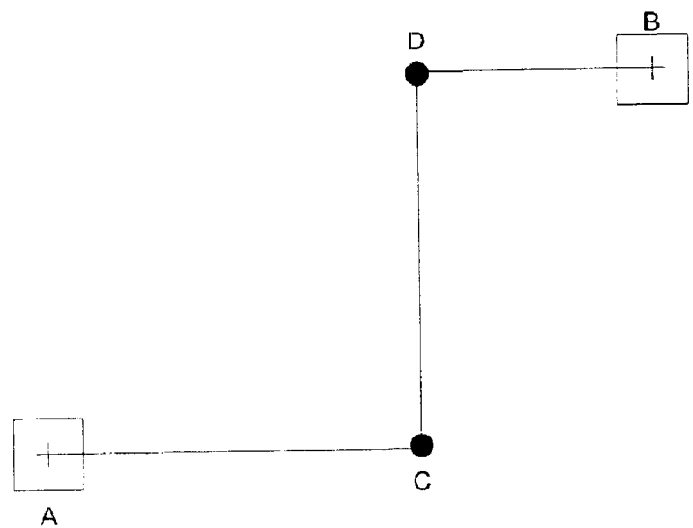
FIG. 1B shows an example of an ideal routing.

FIG. 1B-are next discussed to describe the basic steps of the routing approach of the present invention.

In FIG. 1B, nodes A and B are connected by an ideal routing of line segments A-C-D-B. This routing is ideal because it follows the following rules shown in Table I

TABLE I

1. Draw a first line segment horizontally from the first node to the second node.
2. At a point past the midway point of a line joining the first and second nodes, make a 90 degree angle to begin traversing the vertical separation between the two nodes to draw the second line segment.
3. Once at the horizontal from the second node, draw a final, third line segment to connect to the second node.

The routing described in Table I and FIG. 1B is considered "ideal" since it results in a short, direct, organized and easily-followed path. By placing the start of the second segment past the midway point of the distance between the first and second nodes, a visual coherency is produced in an overall layout having many connections. The flow is more visually left-to-right, in accordance with information presentation in technology applications and documents. An indication of the start and end of connections is subtly provided without adding to display clutter or using excess display real estate.

Figure 1C:
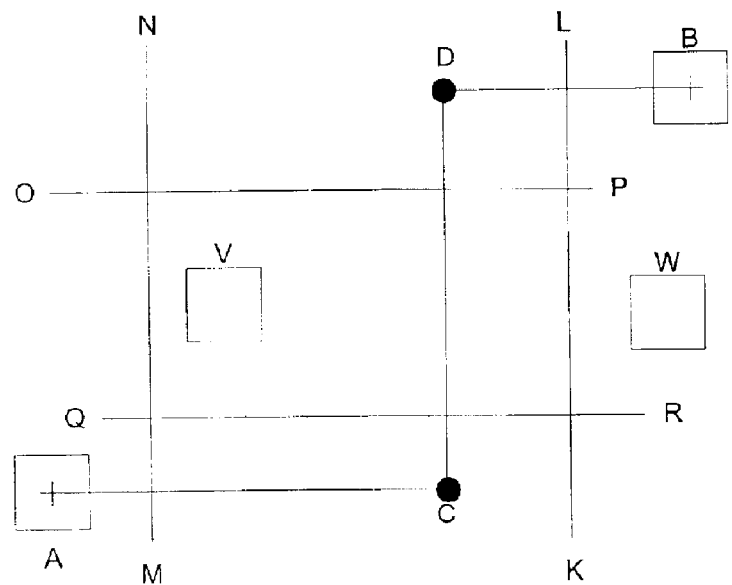
FIG. 1C shows grid lines used for routing.

As discussed above, line segments other than the node join segments are obtained from a set of grid lines that is computed for each node group. For example, FIG. 1C shows some grid lines in the set for the illustrated node group. These grid lines (in addition to line segment C-D) are K-L, M-N, O-P, and Q-R. These grid lines are predefined, and nodes placed between the grid lines, such that the grid lines do not intersect any nodes in the group. For example, nodes A, B, V and W of FIG. 1C will not lie on any grid lines.

Naturally, deviations from the ideal routing are often encountered. This occurs when one of the three segments of the ideal routing causes an unwanted intersection with a node.

Figure 1D:
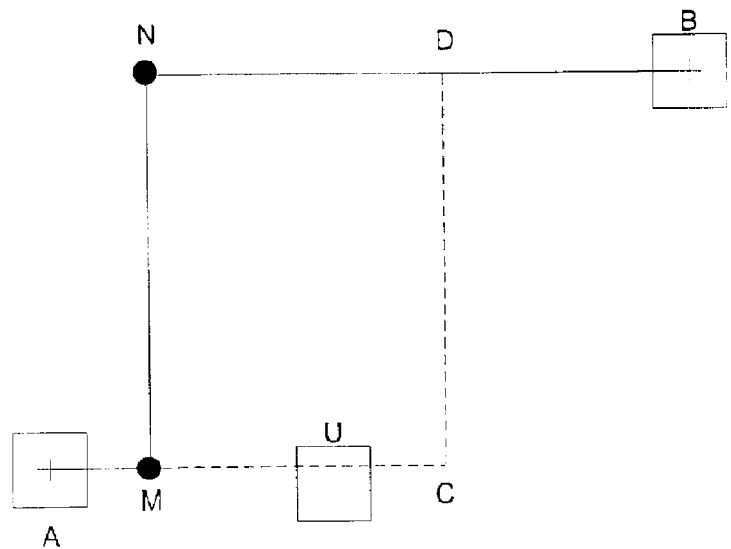
FIG. 1D illustrates a case where an ideal routing causes an intersection with a line segment.

FIG. 1D illustrates a case where the ideal routing causes an intersection with line segment A-C and node U. In this case, a segment other than C-D must be employed to make the vertical traverse. A preferred embodiment of the present invention selects a grid line that is as far from node A as possible, and that does not cause the first segment to intersect with node U. In the case shown, such a grid line is M-N. Note that other vertical grid lines may exist that intersect between A and M, but these would not be selected.

Thus, the routing that bypasses node U is A-M-N-B.

Figure 1E:
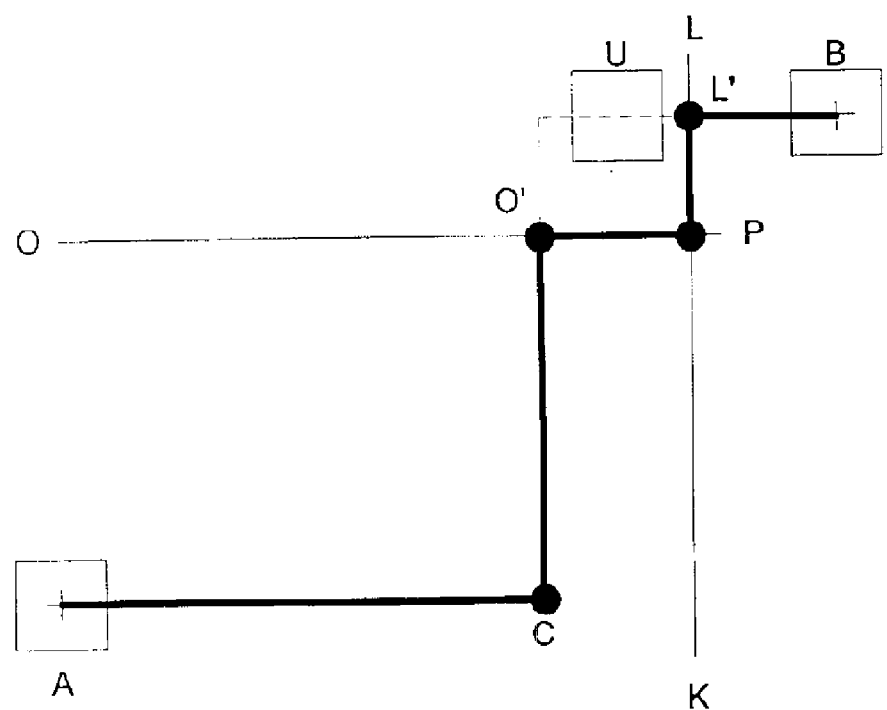
FIG. 1E illustrates the case where a node obstruction is encountered in a line segment of the ideal routing.

FIG. 1E illustrates the case where a node (or other obstruction) is encountered in the third line segment, D-B, of the ideal routing.

In FIG. 1E, node U is undesirably intersected by DB in the ideal routing. A vertical grid line that is as far from B as possible along DB but which lies between the obstruction, node U, and node B is identified. In FIG. 1E, such a vertical grid line is KL. Next a horizontal grid line is selected that is as close as possible to the original third line segment D-B. Such a horizontal grid line is O-P. The selected grid lines are used to define new line segments so that the routing becomes A-C-O'-P'-L'-B as shown by the thick line segments of FIG. 1E.

Thus, the basic routing procedure of the present invention has been described with reference to FIGS. 1A-E and Table I.

Next, basic hardware suitable for implementing an automated process for achieving the present invention is presented, followed by a detailed description of steps used for routing, steps for routing in a multi-layered system, and a flowchart depicting basic routing procedure.

Figure 2A:
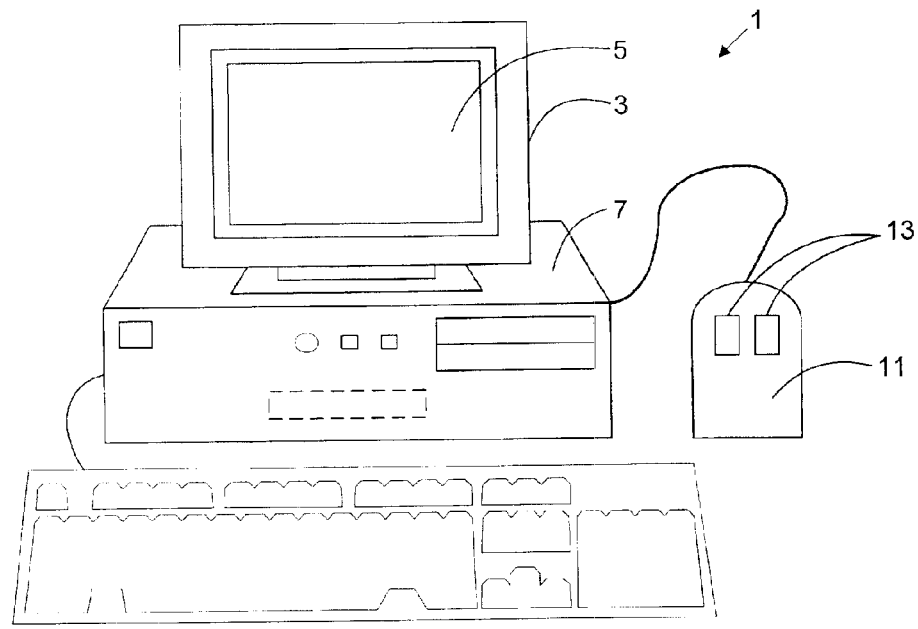
FIG. 2A illustrates a computer system suitable for use with the present invention.
Figure 2B:
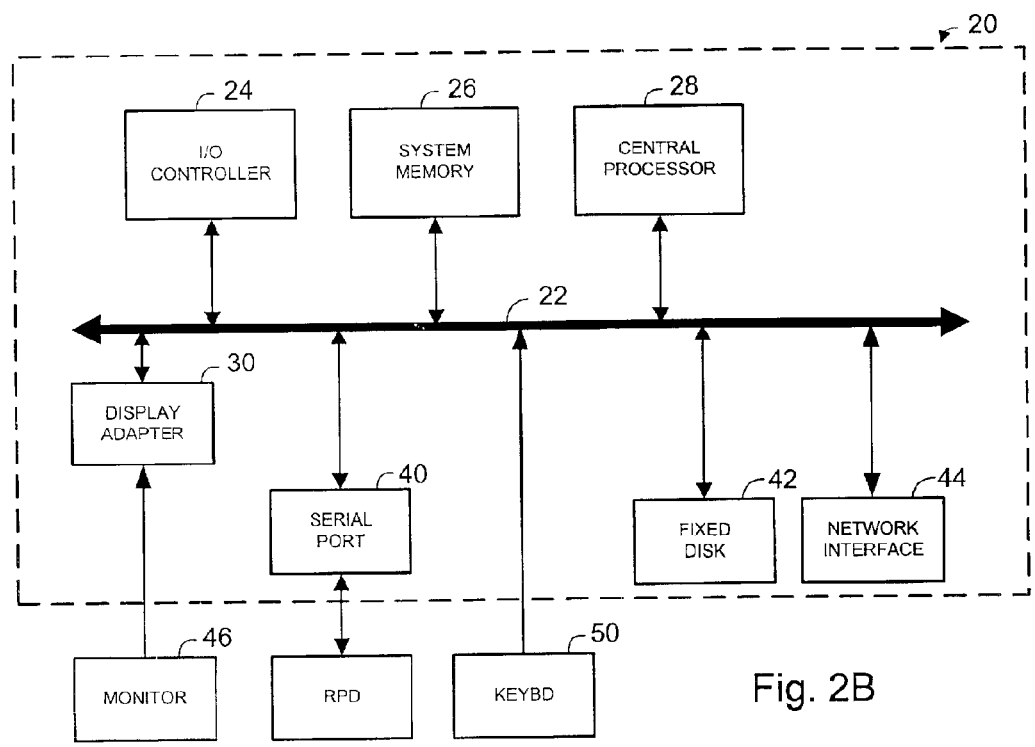
FIG. 2B illustrates subsystems of a computer system.

FIGS. 2A and 2B illustrate hardware suitable for use with the present invention.

FIG. 2A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 2B illustrates subsystems that might typically be found in a computer such as computer 1.

In FIG. 2B, subsystems within box 20 are directly interfaced to internal bus 22. Such subsystems typically are contained within the computer system such as within cabinet 7 of FIG. 2A. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems viabus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 2A, many subsystem configurations are possible. FIG. 2B is illustrative of but one suitable configuration. Subsystems, components or devices other than those shown in FIG. 2B can be added. A suitable computer system can be achieved without using all of the subsystems shown in FIG. 2B. For example, a standalone computer need not be coupled to a network so Network Interface 44 would not be required. Other subsystems such as a CDROM drive, graphics accelerator, etc. can be included in the configuration without affecting the performance of the system of the present invention.

A procedure for using a multi-layered hierarchy to achieve routing by using the specific routing of the present invention, or by using any other routing scheme, is described below in the steps of Table II.

TABLE II

1. Find the common ancestor group of the 2 nodes to be connected.
2. Route the connection from one of the end nodes to the gridlines of the common ancestor group along the gridlines of the common ancestor group subgroups and in the general direction of the other end node.
3. Route the connection from the emergence of one set of subgroups, ancestor of one node, to another set of subgroups, ancestors of the other node, along the gridlines of the common ancestor node (this step is described in detail in the discussion of Table III, below).
4. Route the connection from the common ancestor node gridlines to the second end node, along the gridlines of the common ancestor group subgroups, parents of the second node.

Table III, below, recites details of steps to route connections according to an embodiment of the present invention. In Table III, the description refers to items in FIG. 1A, above.

TABLE III

0. The start node is indicated by its center A (see FIG. 1A), the end node is indicated by its center B. The common ancestor node of A and B is computed to determine the grid lines that are going to be used to route the link. Routing the link along grid lines ensures that no nodes will be crossed (provided that the correct grid is used, i.e., the grid owned by the common ancestor of A and B). The "ideal" path is A-C-D-B. C is on a horizontal with A, and is on the first grid line after the middle point of the TABLE III-continued projection of the A-B segment on the horizontal line on which A is located. D is at the intersection of the vertical from C and the horizontal from B. If the A-C-D-B path crosses some nodes, adjustments need to be made. These adjustments are described below.

1. Check that there is no node on the segment A-C.
1.1 If the A-C segment fails (i.e. there is a node between A and C), find the point E which is the maximum extent of the horizontal segment starting from A that does not cross a node, E being on a grid line. Check that there is no node on the segment F-B, F is the intersection between the vertical from E and the horizontal from B.
1.1.1 If the F-B segment fails (i.e., there is a node between F and B), find the point G which is the maximum extent of the horizontal segment starting from B that does not cross a node and that is smaller than half the distance between B and F, G being on a grid line. The routing path is A-E-H-I-G-B, H is on the E-F segment at the intersection of the last grid line before F, I is the intersection of the horizontal from H and the vertical from G.
1.1.2 If the F-B segment succeeds (i.e., there is no node between F and B), the routing path is A-E-F-B.
1.2 If the A-C segment succeeds (i.e., there is no node between A and C), check that there is no node on the segment D-B.
1.2.1 If the D-B segment fails (i.e., there is no node between D and B), find the point G as defined above. Check that there is no node on the segment A-J, J is the intersection between the horizontal from A and the vertical from G.
1.2.1.1 If the A-J segment fails (i.e., there is a node between A and J), the routing path is A-E-H-I-G-B as defined above.
1.2.1.2 If the A-J segment succeeds (i.e., there is no node between A and J), the routing path is A-J-G-B.
1.2.2 If the A-C segment succeeds (i.e., there is no node between A and C) and the B-D segment succeeds (i.e., there is no node between B and D), the routing path is the "ideal" path A-C-D-B.

Note that the procedures of the present invention work advantageously with the multi-layered design of network topology discussed herein and in the related applications cited above. In FIG. 1A, node A can be an entry node into the group of nodes of FIG. 1A. Naturally, there can be many nodes in a group. Node B, for example, can be a group of nodes that is expanded to allow connecting to any of the nodes in node group B via an entry node such as node A for the presently displayed group. Thus, by casting complex systems into groups of nodes in a layered hierarchy of groups and subgroups, complex routing can be easily performed.

Figure 3:
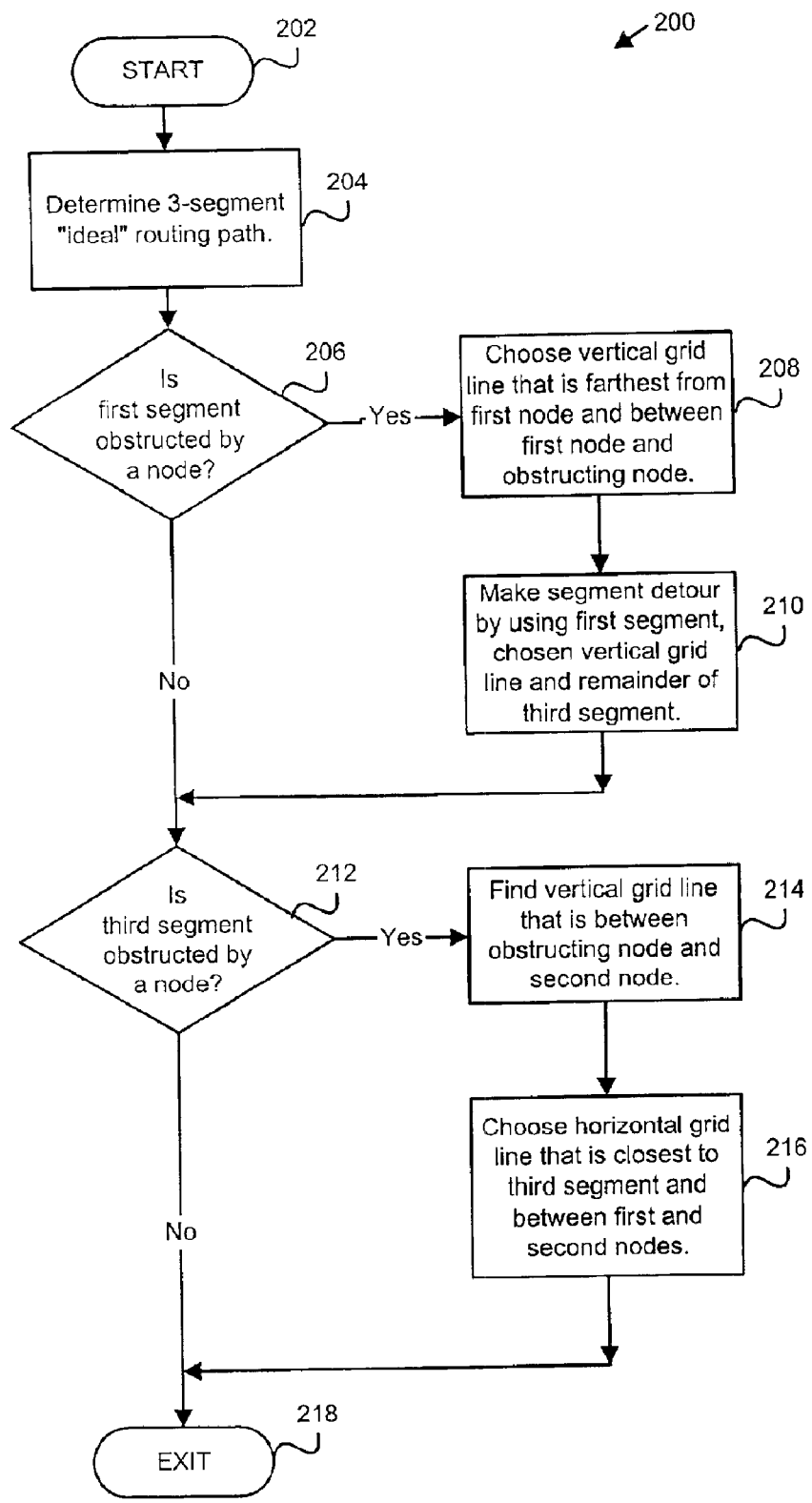
FIG. 3 shows a flowchart illustrating basic steps of a routine to route connections.

FIG. 3 shows flowchart 200 illustrating the basic steps of a routine to route connections in the present invention.

In FIG. 3, the routine is entered at step 202 where it is assumed that two nodes of a common ancestor node are identified and it is desired to route a connection between the two nodes. At step 204, the ideal routing path is determined as described, above. As mentioned, this yields first and third segments that are node join segments, and a third segment on a grid line that is guaranteed not to intersect with any other obstructing nodes or other items.

At step 206 a test is made to check if the first segment is obstructed by a node. If it is not, execution proceeds to step 212 where a check is made as to whether the third segment is obstructed by a node. If no, the ideal routing path determined at step 204 can be used as the connection and the routine exits at 218.

Returning to step 206, if there is a node obstructing the first segment then step 208 is executed where a new vertical grid line must be chosen in place of the second segment. This new vertical grid line is chosen as far as possible from the first node while still being between the first node and the obstructing node. At step 210, the first segment is made to connect with a segment on the new vertical grid line so that the obstructing node is bypassed and execution returns to step 212. Thus, steps 208 and 210 serve to systematically create a detour around any obstructions encountered by the original first segment of the ideal routing path.

At step 212, assuming there is an obstructing node intersecting the original third segment, execution proceeds to step 214. At step 214, a vertical grid line is found that is between the obstructing node and the second node. At step 216, a horizontal grid line that is closest to the original third segment and that is located between the first and second nodes is chosen. Using the vertical grid line of step 214 and the horizontal grid line of step 216, a detour around the node obstructing the original third segment can be constructed. The third segment is shortened, accordingly, to form a path that ends at the desired second node and the routine is exited at step 218. Thus, steps 214 and 216 serve to provide a systematic way to determine detours around any obstructions on the third segment.

The flowchart descriptions of the methods, routines and systems presented herein are only intended to be a general indication of the basic steps of the routines. Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing. Steps can be added to, taken from or modified from the steps in the flowcharts presented in this specification without deviating from the scope of the invention. In general, the flowcharts are only used to indicate one possible sequence of basic operations to achieve a functional aspect of the present invention.

Note that although a preferred embodiment of the invention has discussed the invention with respect to a specific ideal routing, other "ideal" routings can be employed that provide similar advantages. For example, instead of the first segment traversing the horizontal distance between the two nodes, the vertical distance can be traversed, instead. It should be apparent that the routing discussed herein can be symmetrical in either of several dimensions. Although the invention is presented herein with respect to two dimensions, additional dimensions can be employed.

Also, other embodiments may use diagonal line segments, curved line segments, etc. Connections need not only be lines but can be broken lines, groups of lines, bars, way points (e.g., arrows indicating directions to the next way point), etc.

Although the present invention has been discussed with respect to specific embodiments, these embodiments are merely illustrative, and not restrictive, of the invention. The scope of the invention is to be determined solely by the appended claims.

What is claimed is:

1. A method for displaying connections in a system for displaying a network topology, the method comprising
    displaying first and second nodes on the display screen;
    defining a plurality of lines for connecting the first node to the second node, wherein the plurality of lines include a first line group parallel to a first direction and a second line group parallel to a second direction, wherein lines in the second line group are not parallel with lines in the first line group;
    displaying a connection between the first and second nodes according to the following substeps:
        selecting a line from the first line group, wherein the selected line is coupled to the first node;
        choosing a line from the second line group that intersects the selected line, wherein the step of choosing includes proceeding on a path from the first node along the selected line until an obstructing node is encountered and then using the last intersecting line passed as the chosen line, but if there is no obstructing node then using the first intersecting line encountered after passing the midpoint of the selected line as the selected line; and
    displaying a connection between the chosen line and the second node.

2. The method of claim 1, wherein the step of displaying a connection between the chosen line to the second node includes substeps of
    selecting a second line from the first line group, wherein the selected second line is coupled to the chosen line;
    determining a second line from the first line group that intersects the chosen line, wherein the step of determining includes proceeding on a path from the intersection point of the selected line and the chosen line and moving along the chosen line until an obstructing node is encountered and then using the last intersecting line passed as the determined line, but if there is no obstructing node then using the first intersecting line encountered after passing the midpoint of the chosen line as the determined line; and
    displaying a connection between the determined line and the second node.

3. The method of claim 1, wherein the first and second directions are perpendicular to each other.

4. The method of claim 3, wherein the first direction is horizontal and the second direction is vertical.

5. The method of claim 1, wherein the first and second nodes belong to a first node group, wherein multiple node groups are organized into a hierarchy.

6. A method for displaying connections in a system for displaying a network topology, the method executing in a digital processing system, the digital processing system including a processor coupled to a display, the display including a depiction of first and second nodes, the method comprising
    displaying horizontal and vertical lines on the display to connect the first and second nodes, wherein the path from the first node to the second node alternates between horizontal and vertical lines, wherein a horizontal and vertical line along the path are connected at a crosspoint;
    selecting the crosspoint such that no obstructing node is encountered along the path; and
    ensuring that the crosspoint occurs beyond a predetermined distance along a given line unless this causes the path to cross an obstructing node, in which case the crosspoint is made to be before the obstructing node.

7. The method of claim 6, wherein the predetermined distance along the given line is measured with respect to the first node.

8. The method of claim 6, wherein the predetermined distance along the given line is measured with respect to a crosspoint.

9. An apparatus for displaying connections in a system for displaying a network topology, the apparatus using a digital processing system, the digital processing system including a processor coupled to a display, the display including a depiction of first and second nodes, the apparatus comprising a process for displaying horizontal and vertical lines on the display to connect the first and second nodes, wherein the path from the first node to the second node alternates between horizontal and vertical lines, wherein a horizontal and vertical line along the path are connected at a crosspoint;

a process for selecting the crosspoint such that no obstructing node is encountered along the path; and a process for ensuring that the crosspoint occurs beyond a predetermined distance along a given line unless this causes the path to cross an obstructing node, in which case the crosspoint is made to be before the obstructing node.

10. A computer-readable medium comprising one or more instructions for displaying horizontal and vertical lines on the display to connect the first and second nodes, wherein the path from the first node to the second node alternates between horizontal and vertical lines, wherein a horizontal and vertical line along the path are connected at a crosspoint;

one or more instructions for selecting the crosspoint such that no obstructing node is encountered along the path; and one or more instructions for ensuring that the crosspoint occurs beyond a predetermined distance along a given line unless this causes the path to cross an obstructing node, in which case the crosspoint is made to be before the obstructing node.

11. A digital signal included in a carrier wave comprising one or more instructions for displaying horizontal and vertical lines on the display to connect the first and second nodes, wherein the path from the first node to the second node alternates between horizontal and vertical lines, wherein a horizontal and vertical line along the path are connected at a crosspoint;

one or more instructions for selecting the crosspoint such that no obstructing node is encountered along the path; and one or more instructions for ensuring that the crosspoint occurs beyond a predetermined distance along a given line unless this causes the path to cross an obstructing node, in which case the crosspoint is made to be before the obstructing node.

* * * * *